Jan. 17, 1961  H. S. RAIFSNIDER  2,968,102
INDICATING DIAL BORE GAGES
Filed Dec. 5, 1957

INVENTOR.
HAROLD S. RAIFSNIDER

ATTORNEY

2,968,102

INDICATING DIAL BORE GAGES

Harold S. Raifsnider, 4171 42nd St., San Diego, Calif.

Filed Dec. 5, 1957, Ser. No. 700,873

8 Claims. (Cl. 33—178)

My invention relates to indicating dial bore gages, particularly as required for high precision quantity production holes that must be held to a diameter tolerance total of .0005" or less, and its principal object is to provide a better gage of this character, having a hole diameter range of approximately twenty times the range of those dial bore gages now on the market, and capable of checking hole diameters to an accuracy of .0001".

While the standard dial bore gage now in use has a range of .010" from the diameter at which it is set, my d al bore gage has an average range of .200" from the diameter at which it is set. The standard dial bore gage requires a change in the length of the static contact, the use of a setting ring, or fixture and gage blocks to reset the dial bore gage for any hole diameter that is .005" larger or smaller than the diameter of the gage at which it was previously set, and the resetting is a series of trial and error adjustments of the delicate parts of the static contact. For example, with the standard dial bore gage being set with hole diameters starting at .500" and increasing in diameter by .005" there would be th.rty-four settings to make to reach a diameter of .670". With my dial bore gage, however, there could be measured any and all of the thirty-four diameters with the one original setting, this original setting not requiring setting rings, fixtures nor gage blocks.

My dial bore gage comprises a convent.onal dial and a plunger having a conical head connected therewith, the head of said plunger being actuated through the squeezing together of two separable protruding contact balls, and in setting the gage, these balls are compressed with the fingers until the balls are firmly in positive contact; thereupon, the diameter of the balls being known, the indicator dial will then be caused to be rotated until it zeros on that diameter. The gage will then register diameters from this setting (minimum) to a dimension equal to this minimum plus the diameter of the conical head of the plunger. The gage can be checked for correct setting at intervals by simply compressing the contact balls and noting the setting.

Other objects of my invention are to provide a dial bore gage that can readily be picked up, inserted in the hole, dimension noted and the gage thereupon laid down; to furnish a dial bore gage that can be used by the average mechanic for positive gaging accuracy without the high degree of skill needed where parts are small and delicate, or where it is necessary to check in a limited time a large number of holes of various diameters; to provide a gage operated by a plunger longitudinally actuated by two opposing contact balls serving as self-adjusting squeezing bearings at the end of the extension of the device, said balls being each of the same spherical dimensions and together being capable of checking any hole whose d.ameter falls between the sum of the diameters of the two balls and said sum plus the diameter of the conical head of the plunger used, the said plunger being ordinarily of a diameter equal to the diameter of each of the said balls, and said balls being positioned readily to turn when in use, giving long wear and being easily replaced; to render the parts readily accessible for inspection, adjustment, removal, renovation, replacement and repair; in general, to provide a dial bore gage which is simple, compact, and economical of construction, saving of labor, efficient in action, and of long life and durability. My invention further consists of other novel features of construction, and combinations and arrangements, of elements and parts illustrated in the drawing and hereinafter more specifically described and claimed.

Attention is hereby directed to the accompanying drawing, illustrating a preferred form of my invention, in which drawing similar numerals of designation refer to similar parts throughout the several views, and in which—

Figure 1:
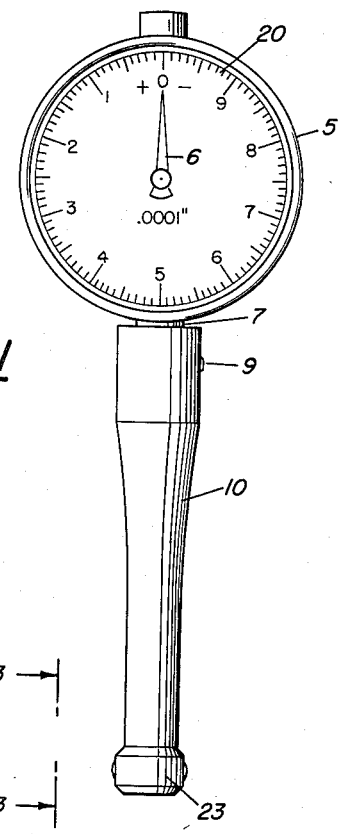
Figure 1 is a front elevation of an indicating dial bore gage embodying said form of my invention, showing the dial indicator, and extension assembly.

Referring to the drawing, the dial indicator 5 and body and parts thereof there shown are generally conventional in form and construction; the said indicator having the usual pivotally mounted hand 6 for indicating the reading on a scale. The indicator is conventional; however, it is necessary to provide a specially graduated dial scale 20. The dial scale graduations should be in units of .001", each complete revolution of the indicating hand (from zero to zero) should cover a single .010" or multiples thereof and each .001" should be sub-divided five or ten times to indicate .0002" or .0001" respectively. Inasmuch as the rack and gearing of the conventional indicator moves in direct proportion to the dimension it is registering and the contact balls of the bore gage are moving toward each other, activating the axially moving tapered plunger which terminates in a 90 degree angled cone, the actual movement of the plunger is half the combined movement of the two balls.

Radially protruding from the body of said dial 5 and integral therewith is the hollow cylindrical outlet 7, through the passageway of which longitudinally plies the stem 8, operatively connected to the usual rack and pinion or other conventional mechanism (not shown) for activating the hand 6.

Removably affixed to the stub outlet 7 by the set screw 9 is the elongated hollow extension 10, having formed within the top portion thereof the chamber 11, shaped to receive and seat the end of said outlet 7, and having the passageway 12 leading therefrom to the socket 13 formed within the outer end portion of said extension. Secured to the outer end of the stem 8 by the threaded sleeve 14, and passing through the passageway 12, is the plunger 15, having the cylindrical head 16, terminating in the form of a wedge or preferably a 90 degree angled cone 17; said head being dimensioned and shaped to be slidably mounted within said socket 13. Encompassing the shank of said plunger, adjacent to the head thereof, is the helical compression spring 18, interposed between said head and the shoulder 19 of said socket, and serving normally to hold the plunger 15 in yielding spring extension in the manner and for the purpose shortly to be described.

Figure 2:
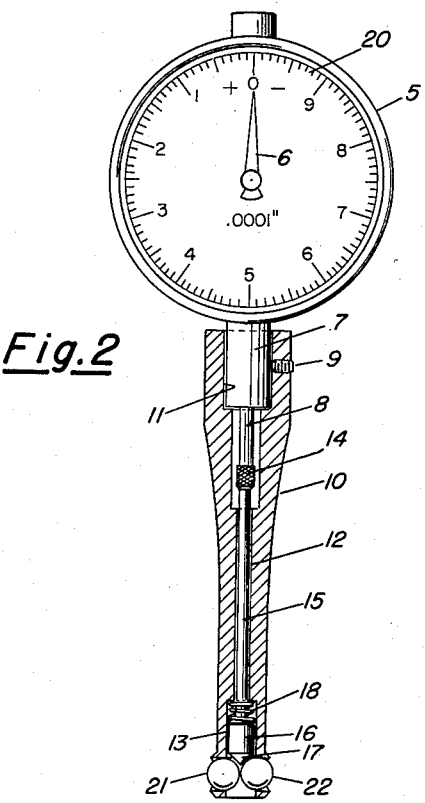
Fig. 2 is a view similar to that of Fig. 1, except that the extension thereof is shown in longitudinal section, disclosing within the bore thereof the plunger, plunger-head, actuating spring, and self-adjusting contact balls seated at the end of said extension.
Figure 3:
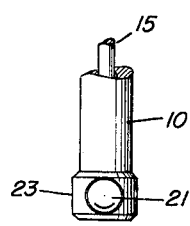
Fig. 3 is a fragmentary view of the end of said extension and one of said balls, looking at the same in the direction indicated by the arrows 3—3.
Figure 4:
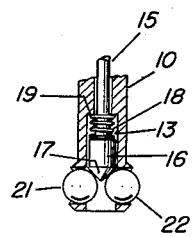
Fig. 4 is a center sectional view of the structure shown in Fig. 3 rotated 90 degrees, showing the plunger-head at the position of its partial protrusion between said balls, and the expansive spread of said balls so held apart.

Confined within a portion of the socket 13 defining a cylindrical chamber formed within the extreme lower end of the extension 10, are the two identical contact balls 21 and 22 of known dimension, being each accurately spherical in form and of highly tempered hardened steel, or other suitable material. As shown in Figs. 2 and 4, the side walls of the socket 13, while widely apertured to permit the periphery of each ball largely to protrude outwardly therefrom, nevertheless are confined in extent so as always to secure said balls well within said socket and to guard said balls from escape outside. Also, it is to be observed that the parts of the gage are arranged so that when the balls are compressed into actual contact, the cone 17 of the head will be squeezed upwardly therefrom, the plunger upraised and the said parts will be in the position shown in Figs. 1 and 2, at which position of said parts, the dial is set at zero; but that when the balls and adjacent parts are in the most extended position, the hand of said dial will be set at the highest range thereof, which is the normal position of the gage when ready for application to the hole, the size of which is to be determined.

In operation, the outer end of the extension 10, carrying the balls 21 and 22, is applied to the work by allowing said balls to be compressed within the hole, at which time the head 16 will be pressed toward the dial 5, raising the plunger 15 to actuate the hand 6 to indicate upon the scale 20 the determination in ten-thousandths of an inch the diameter of the hole.

For example, setting the dial at zero, and using two balls each a quarter of an inch in diameter, the hole diameter to be determined from compression of the balls therein would range from .5000" to .7500". If as is usual, before gaging a hole the diameters are known to be within plus or minus .005" of nominal or required size, no revolution counter hand on the dial is neccessary, but if the accumulated revolutions of the indicator hand are required, an indicator with a revolution counter hand, not illustrated, can be used. Thus, the range of my dial bore gages employing balls is directly governed by the diameters of the balls and conical head of the plunger used, the various diameters of the balls available being infinite, and so it is possible to measure holes whose diameters vary greatly.

My invention may be embodied in other specific forms without departing from the spirit or essential characteristics thereof. The present embodiment, as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In an indicating dial bore gage, the combination of a dial indicator having a scale graduated to indicate hole dimensions in ten-thousandths of an inch; mechanism for operating said dial indicator; a hollow extension connected with and downwardly protruding from said dial indicator, and communicating with the interior thereof; a plunger mounted to slide within said extension and connected with the mechanism for operating said dial indicator; said plunger having at the end thereof a head terminating in the form of a wedge, two spherical balls held in non-escapable separation at the end of said extension, the wedge of said head being located to be interposed between said balls and upon compression thereof to cause the longitudinal movement of said plunger and the actuation of said dial indicator to indicate dimensions upon the scale thereof, said balls being of critical, known diameter and being manually compressible together for self-setting of the dial indicator at the fixed minimum setting of the bore gage, thereby avoiding the necessity for setting rings or the like.

2. In an indicating dial bore gage, the combination of a dial indicator having a scale graduated to indicate hole dimensions in ten-thousandths of an inch; mechanism for actuating said dial indicator; a hollow extension connected with and downwardly protruding from said dial indicator, and communicating with the interior thereof; a plunger mounted to slide within said extension and being operatively connected with the mechanism for actuating said dial indicator; said plunger having at the end thereof a cylindrical head terminating in the form of an extended cone; two spherical balls identical in shape held in movable separation at the end of said extension and protruding from apertures in the walls thereof but inescapable therefrom; the cone of said head being located to be interposed between said balls and upon compression of said balls together to cause the longitudinal movement of said plunger to actuate said dial indicator to indicate dimensions upon the scale thereof, said balls being of critical, known diameter and being manually compressible together for self-setting of the dial indicator at the fixed minimum setting of the bore gage, thereby avoiding the necessity for setting rings or the like.

3. The subject matter of claim 2, the said balls being of identical spherical dimensions and together being capable of gaging any hole whose diameter falls within the combined diameter of said balls and a dimension equal to said combined diameters plus the diameter of the cylindrical head of said plunger.

4. The subject matter of claim 2, including a spring interposed between the head of said plunger and an obstruction in the wall of said extension, and acting normally to hold said plunger in yielding spring extension against the peripheries of said balls.

5. The subject matter of claim 2, including a helical compression spring encompassing the shank of said plunger and interposed between the head thereof and an adjacent shoulder of the wall of the hollow of said extension, and acting normally to hold said plunger in yielding spring extension against the peripheries of said balls.

6. A bore gage comprising: an indicator including a portion having a gage-actuating axially sliding stem operatively mounted therein and terminating in a contact point; a hollow member mounted on said portion and into which said stem extends; said member having an accurately machined cylindrical chamber therein, remote from said stem and normal thereto; a pair of identical balls of critical, known diameter and having a close sliding fit in said cylindrical chamber and protruding from opposite ends thereof; and a plunger slidably mounted within said member and having axial driving relation with said stem; said plunger having a tapered head interposed between said balls and means to bias said plunger toward said balls to urge separation of the balls and the protrusion thereof from the ends of said cylindrical chamber for contact with the sides of a hole in a work piece, said balls being means for self-setting the gage by reason of their being manually compressible together, and when so compressed together providing a minimum reference dimension equal to twice the critical, known diameter of the ball; said indicator being adjustable to correspond with said minimum reference dimension prior to any bore measurement and the gage being adapted to measure holes within the range extending from said dimension to said dimension plus the effective dimension of said head, thereby avoiding the necessity for setting rings or the like.

7. A bore gage according to claim 6 wherein said indicator is a dial indicator.

8. A bore gage according to claim 6 wherein said indicator is a dial indicator and said portion is a stub outlet from which said stem extends, said hollow member being secured to said stub outlet and being elongated with said plunger axially slidably mounted therein, said means to bias being a spring coaxially mounted on said plunger and compressed between said head and an adjacent portion of said member to bias the plunger toward said balls.

References Cited in the file of this patent

UNITED STATES PATENTS 2,665,496    Wynne _____ Jan. 12, 1954

FOREIGN PATENTS 385,166    Germany _____ Dec. 6, 1923
519,551    Great Britain _____ Mar. 29, 1940
482,794    Italy _____ July 8, 1953